United States Patent [19]

Gallup

[11] Patent Number: 5,098,578
[45] Date of Patent: Mar. 24, 1992

[54] TREATMENT OF GEOTHERMAL BRINE

[75] Inventor: Darrell L. Gallup, Chino Hills; John L. Featherstone, El Centrol, both of Calif.

[73] Assignee: Union Oil Company of California, Los Angeles, Calif.

[21] Appl. No.: 530,225

[22] Filed: May 30, 1990

[51] Int. Cl.$^5$ .............................................. C02F 1/62
[52] U.S. Cl. ................................. 210/696; 210/724; 210/747; 210/912; 423/43; 423/50; 423/92; 423/101
[58] Field of Search ............... 210/747, 912, 724, 765, 210/726, 696; 423/42, 43, 50, 92, 101

[56] References Cited

U.S. PATENT DOCUMENTS

| | | | |
|---|---|---|---|
| 4,500,434 | 2/1985 | Jost et al. | 210/696 |
| 4,522,728 | 6/1985 | Gallup et al. | 210/718 |
| 4,537,684 | 8/1985 | Gallup et al. | 210/696 |
| 4,615,808 | 10/1986 | Gallup et al. | 210/718 |
| 4,978,457 | 12/1990 | Gallup et al. | 210/747 |

Primary Examiner—Stanley S. Silverman
Assistant Examiner—Neil M. McCarthy
Attorney, Agent, or Firm—Gregory F. Wirzbicki; Clark E. DeLarvin

[57] ABSTRACT

A method of precipitating metals from a spent geothermal brine containing the same comprises admixing the geothermal brine with a condensate of steam, derived from the brine, in a volume ratio of brine to condensate of 1:2 to 1:10. The invention is particularly applicable to geothermal brine processes for the production of electric power, such as are practiced at the Salton Sea.

33 Claims, No Drawings

TREATMENT OF GEOTHERMAL BRINE

FIELD OF THE INVENTION

The invention relates to the treatment of a hot aqueous brine containing various dissolved components, such as iron, zinc, manganese, lead, and silver, for the enhanced recovery of one or more of those components. More particularly, the invention relates to a method wherein such a brine is treated with a controlled portion of a condensate of steam, derived from the brine, to enhance precipitation of the component.

BACKGROUND OF THE INVENTION

The solubility of most ions in solution decreases with a decrease in the temperature or pressure of the solution. If dissolved ions are present, near their saturation concentration in the solution, a slight reduction in the temperature or pressure can result in precipitation of a portion of these ions. The ions frequently combine and deposit as a scale on any solid surface with which they come into contact, such as a vessel or conduit in which the solution is confined. An example of such a solution is a geothermal brine.

Geothermal brines are used, among other things, for the generation of electric power. Typically, a geothermal brine, having a temperature above about 400° F., is flashed to a lower pressure in one or more flashing stages to produce steam and a spent brine. The steam is used to drive a steam turbine-electric generator combination. The spent brine is filtered and returned to the geothermal aquifer via a dedicated brine injection well. Typically, the steam is condensed and placed in a holding pond until a sufficient quantity is accumulated for reinjection into a dedicated condensate injection well. The amount of brine requiring reinjection is typically in excess of about 6000 gallons per minute. The amount of steam condensate produced, which also requires disposal, amounts to about 200 gallons per minute. Formidable problems are encountered in handling and disposing of such large amounts of heavily contaminated and highly saline geothermal liquids.

One of the more serious problems, encountered in using a geothermal brine for producing electric power, results from scaling and deposition of solids in the equipment used to confine the brine. A typical geothermal brine has been confined in a subterranean reservoir for an extraordinarily long period of time at elevated temperatures. As a result, large amounts of minerals have been leached from the reservoir into the brine. Typically, salts and oxides of heavy metals such as lead, zinc, iron, silver, cadmium, molybdenum, manganese and even gold are found in geothermal brines. Other more common minerals, such as calcium and sodium, also are dissolved in the brine, as are naturally occurring gases, including carbon dioxide, hydrogen sulfide and methane. An especially troublesome component of the brine is silica.

All of these components tend to precipitate out at almost every stage of brine processing. Even when the brine has completed its passage through a plant, it will contain a sufficient concentration of these components to eventually result in plugging of the injection wells used to return the brine and condensate to the geothermal aquifer.

In a typical geothermal plant, the steam condensate is sent from the condenser to a holding pond at a rate of approximately 200 gallons per minute. The rate will vary throughout the year, with a higher discharge rate occurring during the cool winter months and a lower discharge rate occurring during the hot summer months. In addition, blow-down from the cooling towers also is discharged to the holding pond at periodic intervals. The condensate is held in the holding pond for a sufficient time to permit most of the sulfides and sulfites contained therein to oxidize to sulfates. The sulfates are less likely to form scales which could result in plugging of the injection well.

During operation of a geothermal-electric power plant, a certain amount of brine also is introduced into the holding pond. The brine generally results from spills, brine which is bypassed to the pond during startup, and a certain amount of wash water from brine filters. It has been found that the pond rapidly fills with a precipitate comprised of metal carbonates, hydroxides and sulfides. In an actual operating plant, the pond was substantially filled with a sludge of such precipitates after only seven years of operation. The sludge has no appreciable value. Further, traces of heavy metals could render the sludge a hazardous waste and necessitate its disposal in a site suitable for such a waste.

Obviously, it would be advantageous if the formation of the sludge could be eliminated or its disposal cost substantially mitigated. It would be an even greater advantage if the composition of the sludge could be converted to one having a commercial value.

SUMMARY OF THE INVENTION

The present invention provides a method for the selective precipitation of at least one metal from an aqueous fluid, such as a geothermal brine containing the same. It further provides a method for stabilizing the suspended scale forming constituents, such as silica, calcium, and mixtures thereof. This latter feature is particularly important if the aqueous fluid is to be disposed of in an injection well. Any unstable scale-forming constituents could produce scaling of the injection well necessitating frequent and expensive workovers of the well.

In the present invention, a brine solution, particularly a geothermal brine, containing metals and scale-forming constituents dissolved or suspended therein, is contacted with a controlled amount of a condensate of steam derived from the brine. Typically, the brine contains at least one metal selected from the group consisting of iron, zinc, lead, copper, silver and manganese. Frequently, the brine will contain all six of such metals in varying concentrations. Generally, the brine will also include various scale-forming constituents. The more common and troublesome scale-forming constituents comprise compounds of silica, and calcium. When the condensed steam contains sulfur constituents, in the form of sulfites and sulfides, it preferably is aerated to convert substantially all of the sulfur constituents to a sulfate form. The oxidation of the sulfur constituents substantially minimizes any chemical reaction between the sulfur constituent and the desired metal.

The brine and condensate are admixed in amounts to provide a volume ratio of brine to condensate within the range of 1:1 to 1:10, preferably in the range of 1:3 to 1:5, and most preferably a ratio of about 1:4. The condensate and brine are maintained in contact with one another for a time sufficient to achieve substantial precipitation of the metal. Typically, a time of less than about 1 hour, generally less than 30 minutes, and frequently less than about 10 minutes, is sufficient to obtain precipitation of commercially significant quantities of the metal. Obviously, longer times could be utilized.

An advantage of the present invention is that the scale-forming constituents of the brine are substantially stabilized by this treatment. This permits disposal of the brine-condensate mixture into an injection well with minimal scaling in the well.

DETAILED DESCRIPTION OF THE INVENTION

For convenience, the invention will now be described with respect to its most preferred application, the recovery of metals from a waste geothermal brine stream containing the same. For a better understanding of the invention, a brief description of a typical geothermal brine process is provided.

Geothermal brine is withdrawn from a production well which extends down into a geothermal aquifer. The brine temperature will vary considerably from well to well, but is usually in the broad range of from 350° to 600° F., with a brine temperature of between about 450° to 500° F. being typical. The brine is introduced into a wellhead separator in which noncondensable gases are separated from the brine.

From the wellhead separator, the brine is introduced into one or more flashing vessels. Within each flashing vessel, the brine is flashed to a substantially lower pressure. As an example, the brine may be flashed from an initial pressure of about 450 psig to a lower pressure of about 50 psig. The abrupt reduction in pressure produces steam and what is referred to as rejected brine. The steam is passed to a steam turbine-generator to produce electric power. The steam from the turbine is passed to a condenser and cooling tower. A steam condensate, generally at a pH of about 8 to 10, is subsequently discharged into a holding pond where it is exposed to air to convert any sulfites and sulfides contained therein to sulfates. The sulfites and sulfides tend to react with metals forming a troublesome scale. A portion of the condensate is withdrawn for use as process water in the plant operations. All the condensate ultimately is injected to a dedicated condensate injection well.

Rejected brine from the flash vessels is treated to remove suspended solids contained therein. Typically, the brine is passed through one or more clarification vessels in which the solids are allowed to settle. In addition, the brine generally is filtered prior to its being injected into a dedicated brine injection well. Generally, the filtered brine will have a pH of about 5 to 6, a suspended solids concentration between about 5 and 20 parts per million and a total dissolved solids content of about 200,000 to 300,000 parts per million. For a more detailed description of a geothermal brine process see U.S. Pat. No. 4,615,808, the disclosure of which is incorporated herein by reference.

The volumetric rate of brine requiring reinjection is substantial. A typical plant will produce about 6000 gallons of brine per minute. During the processing of brine at such large volumetric rates, a certain amount of spillage is common. Such spillage, generally referred to as brine slop, is drained into the holding pond where it mixes with the steam condensate. In the holding pond, constituents of the brine and condensate react, producing insoluble metal carbonates, sulfides and sulfates.

The volume of solids so formed is substantial. In fact, at a commercial Salton Sea geothermal facility, the holding pond was substantially filled in seven years and had to be shut down for cleaning. The removal of the precipitate from the pond is a time consuming and costly process. In addition, the precipitate has no commercial value. It is not toxic but, nonetheless, requires disposal, preferably in an abandoned well, at a substantial cost. It is to this aspect of geothermal brine processing that the present invention is particularly addressed.

This invention is based on the discovery that, controlling the ratio of brine to condensate in a holding pond, makes it possible to alter the composition of the precipitate formed in the holding pond. The volume ratio of brine to condensate is regulated to be within the range of from 1:2 to 1:10, preferably 1:3 to 1:5 and most preferably about 1:4. Within the foregoing ratios, it is possible to produce a precipitate containing marketable concentrations of valuable metals, such as lead, zinc, silver, copper and manganese. At the same time, the quantity of silica and calcium compounds in the precipitate is substantially reduced.

Typically, the mixture of brine and condensate has a pH within the range of 6.5 to 7.5, and preferably of 6.8 to 7.3. Within such pH range, subsequent deposition of precipitates in the pond, transfer piping, and dedicated injection well is substantially reduced. Accordingly, it is a particular advantage of the present invention that, within the foregoing ratios of brine to condensate, the mixture will be within such a pH range. The brine-condensate mixture and precipitate are readily separated by such techniques as filtration, settling and the like.

The concentration of metal recovered from the brine varies from one metal to another. The more valuable metals, such as copper and silver, are present in the brine in low concentrations, typically less than 5 ppm and 1 ppm, respectively. The recovery efficiencies for these metals is in excess of 70 percent, generally in excess of 80 percent and frequently in excess of 90 percent. Thus, they are recoverable in a sufficient quantity to have a substantial dollar value. The recovery efficiency for lead is in excess of 50 percent, generally in excess of 60 percent and frequently in excess of 75 percent. While this recovery efficiency is lower than that of copper and silver, the concentration of lead in the brine is higher than that of copper and silver. Thus, lead also is recoverable in a sufficient quantity to have a substantial dollar value. The recovery efficiency for zinc is in excess of 30 percent, generally in the range of 35 to 50 percent. This is lower than for lead. However zinc is present in concentrations about four times that of lead. Thus, zinc also is recoverable in a sufficient quantity to have a substantial dollar value. The recovery efficiency for manganese is the lowest, typically about 3 percent to 6 percent. Of the five metals of particular interest, manganese is present in the brine in the highest concentration (about 10 times that of lead) and, hence, also is recoverable in a sufficient quantity to have a substantial dollar value.

EXAMPLE 1

The following test was conducted at a commercial geothermal unit located at the Salton Sea. Four gallons of brine (pH 5.3) from a clarifier were obtained and mixed with 20 gallons of steam condensate (pH 9) which contained less than 10 parts per million dissolved sulfides. The mixture had a pH of about 7.3 and immediately precipitated a brown solid that readily settled. The precipitate (18.6 g) was collected by filtration, dried, and analyzed. Analysis of the resultant solid is presented in Table 1. The precipitated solid consisted primarily of amorphous iron hydroxide. A trace of magnitite was detected in the solid by x-ray defraction. Important metals in the scale include zinc, manganese and lead. Only minor amounts of barite (BaSO$_4$), calcite (CaCO$_3$), silica, copper and silver were present in the solid. The absence of sulfur implies that the metals were precipitated as oxides and hydroxides.

TABLE 1

| Solid Analysis | | | |
|---|---|---|---|
| X-Ray Diffraction | | | |
| Major Qualitative | Amorphous | Trace | Fe$_3$O$_4$ |
| | Moderate | Slight | Trace |
| Fe, Zn | Pb | Cu, Mn, Si | Ag, Ca |
| Quantitative Wt. % | | Calc. Composition | Wt. % |
| Ca | 0.2 | CaCO$_3$ | 0.5 |
| Cu | 0.3 | Cu$_2$O | 0.3 |
| Fe | 36 | FeOOH | 57.2 |
| Mn | 3.9 | MnCO$_3$ | 5.6 |
| Pb | 6.3 | PbO | 6.8 |
| Zn | 15.9 | ZnO | 19.8 |
| Ba | 0.3 | BaSO$_4$ | 0.5 |
| Si | 3 | SiO$_2$ | 6.4 |
| | | Total | 97.1 |
| Ag | 0.05 | | |
| Al | <0.1 | | |
| As | <0.01 | | |
| Mg | <0.1 | | |
| Na | <0.1 | | |
| S | <0.1 | | |
| Au, Pd, Pt | >0.3 ppm | | |

EXAMPLE 2

This example is based upon the data obtained in example 1. The geothermal unit, from which the samples for example 1 were taken, produces an average of 200 gallons per minute of excess steam condensate which is conveyed to the holding pond. The uncontrolled mixing of condensate and waste brine in the pond produces a low value silicate/calcite product. The foregoing example demonstrates that controlled mixing of 200 gallons per minute of excess condensate with 50 gallons per minute of brine will generate 120 tons per year of base metal oxide concentrate, containing significant concentrations of zinc, lead, manganese, copper and silver. It also must be noted that the solid is nearly devoid of calcite. Another significant advantage is that the mixture is at a pH which will inhibit calcite deposition in the pond, transfer piping, and dedicated injection wells. In the past, calcite has scaled the injection well requiring frequent workovers that cost in excess of $25,000 each.

The mineral recovery potential of this regulated condensate-brine mixing is shown in Table 2. Based on the test results, it is estimated that 42,800 pounds of zinc, 17,000 pounds of lead, 10,500 pounds of manganese, 810 pounds of copper and 135 pounds of silver can be recovered per year. The recovery efficiencies of these metals range from 4.3 percent for manganese to 99 percent for silver and copper. The metals precipitated would have a current market value of approximately $60,200 per year. The actual value which could be obtained for these metals is likely to be only 50 percent ($30,100 per year) of their market value, due to shipping and processing cost. In addition, cost savings resulting from reduced workovers of the dedicated injection well is estimated to exceed $50,000 per year. Thus, it is estimated, based on present day economics, that the total labor savings and metal recovery profits for the invention will be in excess of about $80,000 per year.

TABLE 2

| MINERAL RECOVERY RESULTS | | | | |
|---|---|---|---|---|
| Metal | Brine ppm | Solid ppm | Recovery lb/yr | Recovery Efficiency % |
| Ag | 0.5 | 500 | 135 | 99 |
| Cu | 3 | 3000 | 810 | 99 |
| Mn | 900 | 39000 | 10500 | 4.3 |
| Pb | 80 | 63000 | 17000 | 78 |
| Zn | 350 | 159000 | 42800 | 45 |

While a particularly preferred embodiment of the invention has been described, it will be understood that the invention is not limited thereto since many modifications can be made. The invention may be practiced as either a continuous or batch method. In addition, the ratios of condensate to brine may be varied to promote precipitation of different proportions of the various metals. While the pH of the mixture is generally inherently obtainable using the ratios of brine to condensate taught, it also is within the scope of the invention to modify the pH of the mixture through the use of either basic or acidic additives. It is intended to include, within the scope of this invention, all such modifications as will fall within the spirit and scope of the appended claims.

What is claimed is:

1. A method of precipitating at least one metal from a brine containing the same comprising contacting a brine containing at least one metal selected from the group consisting of iron, zinc, manganese, copper, silver and lead, and at least one scale forming species selected from the group consisting of silica and calcium compounds, with a condensate of steam, derived from the brine, in an amount to provide a mixture having a volume ratio of brine to condensate in the range of about 1:2 to 1:10 for a time sufficient to precipitate at least one of said metals and only a minor amount of said scale forming species.

2. The process of claim 1 wherein the ratio of brine to condensate is within the range of 1:3 to 1:5.

3. The process of claim 1 wherein the pH of the mixture is within the range of 6.7 to 7.5.

4. The process of claim 1 wherein said precipitated metal comprises iron, zinc, lead, and manganese.

5. The process of claim 1 wherein said brine is a geothermal brine.

6. The process of claim 1 wherein said brine has a pH in the range of about 5 to 6.

7. The process of claim 1 wherein said condensate has a pH of about 8 to 10.

8. A method of selectively precipitating a metal from a brine, containing the same and a scale forming species, comprising:

contacting a geothermal brine containing at least one metal selected from the group consisting of iron, zinc, lead, copper, silver and manganese, and at least one scale forming species selected from the group consisting of silica and calcium compounds, with a condensate of steam derived from said brine, said condensate being provided in an amount to provide a brine-condensate mixture having a brine-condensate volume ratio of about 1:3 to 1:5;

maintaining said brine and condensate in a contact with one another for a time sufficient to produce (a) a solid precipitate containing at least one of said metals, and only a minor amount of said scale forming species and (b) a stable solution comprising at least one of said scale forming species in said brine-condensate mixture; and recovering said precipitate from said brine-condensate mixture.

9. The process of claim 8 wherein said brine is a Salton Sea geothermal brine.

10. The process of claim 9 wherein the pH of the mixture is within the range of 6.7 to 7.5.

11. The process of claim 10 wherein said precipitated metal comprises iron, zinc, lead, copper, silver and manganese.

12. The process of claim 11 wherein said brine has a pH in the range of about 5 to 6.

13. The process of claim 12 wherein said condensate has a pH of about 8 to 10.

14. The process of claim 8 wherein the ratio of brine to condensate is about 1:4.

15. A method of separately precipitating a metal from a brine, containing the same and scale forming species, comprising:

admixing a geothermal brine containing metals comprising iron, zinc, lead, copper, silver and manganese, and scale forming species comprising silica and calcium compounds, with a condensate of steam derived from said brine, said condensate being present in an amount to provide a brine-condensate mixture having a volume ratio of brine to condensate of about 1:2 to 1:10;

maintaining said brine and condensate in contact with one another for a time sufficient to produce (a) a solid precipitate comprising said metals substantially free of scale forming species, and (b) a substantially stable solution comprising said scale forming species in said brine-condensate mixture; and separating said precipitate from said brine-condensate mixture.

16. The process of claim 15 wherein the ratio of brine to condensate is within the range of 1:3 to 1:5.

17. The process of claim 16 wherein the pH of the mixture is within the range of 6.7 to 7.5.

18. The process of claim 17 wherein said precipitated metal comprises a major amount of iron, and a minor amount of zinc, lead, copper, silver and manganese.

19. The process of claim 18 wherein said brine is a geothermal brine derived from a Salton Sea geothermal aquifer.

20. The process of claim 19 wherein said brine has a pH in the range of about 5 to 6.

21. The process of claim 20 wherein said condensate has a pH of about 8 to 10.

22. The process of claim 21 wherein said brine-condensate mixture, substantially free of precipitate, is returned to the geothermal aquifer.

23. A method of precipitating zinc from a brine containing the same comprising contacting a brine containing zinc and a scale forming species with a condensate of steam, derived from the brine, in an amount to provide a mixture having a volume ratio of brine to condensate in the range of about 1:2 to 1:10 for a time sufficient to precipitate at least 30 percent of said zinc substantially free of said scale forming species.

24. The method of claim 23 wherein 35 to 50 percent of said zinc is precipitated.

25. A method of precipitating lead from a brine containing the same comprising contacting a brine containing lead and a scale forming species with a condensate of steam, derived from the brine, in an amount to provide a mixture having a volume ratio of brine to condensate in the range of about 1:2 to 1:10 for a time sufficient to precipitate at least 50 percent of said lead substantially free of said scale forming species.

26. The method of claim 25 wherein in excess of 70 percent of said lead is precipitated.

27. A method of precipitating manganese from a brine containing the same comprising contacting a brine containing manganese and a scale forming species with a condensate of steam, derived from the brine, in an amount to provide a mixture having a volume ratio of brine to condensate in the range of about 1:2 to 1:10 for a time sufficient to precipitate at least 3 percent of said manganese substantially free of said scale forming species.

28. The method of claim 27 wherein from 3 to 6 percent of said manganese is precipitated.

29. A method of precipitating copper from a brine containing the same comprising contacting a brine containing copper and a scale forming species with a condensate of steam, derived from the brine, in an amount to provide a mixture having a volume ratio of brine to condensate in the range of about 1:2 to 1:10 for a time sufficient to precipitate at least 70 percent of said copper substantially free of said scale forming species.

30. The method of claim 29 wherein in excess of 80 percent of said copper is precipitated.

31. The method of claim 29 wherein in excess of 90 percent of said copper is precipitated.

32. A method of precipitating silver from a brine containing the same comprising contacting a brine containing silver and a scale forming species with a condensate of steam, derived from the brine, in an amount to provide a mixture having a volume ratio of brine to condensate in the range of about 1:2 to 1:10 for a time sufficient to precipitate at least 70 percent of said silver substantially free of said scale forming species.

33. The method of claim 29 wherein in excess of 90 percent of said silver is precipitated.

* * * * *